March 28, 1961 C. R. KILGORE 2,977,110
CONTROL VALVE
Filed Aug. 22, 1957 3 Sheets-Sheet 2
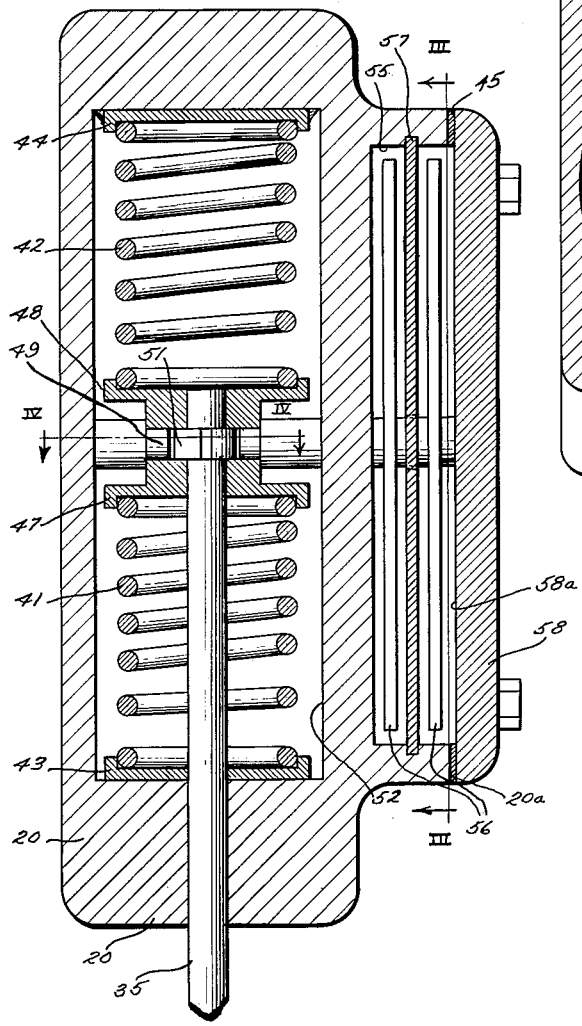
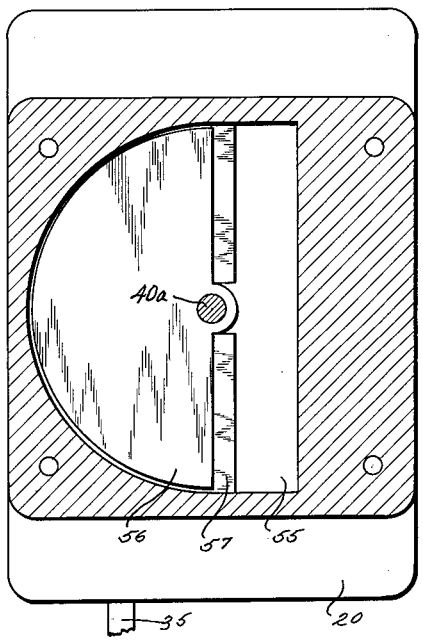
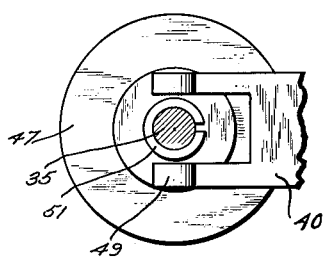
Inventor
CHARLES R. KILGORE March 28, 1961 C. R. KILGORE 2,977,110
CONTROL VALVE
Filed Aug. 22, 1957 3 Sheets-Sheet 3
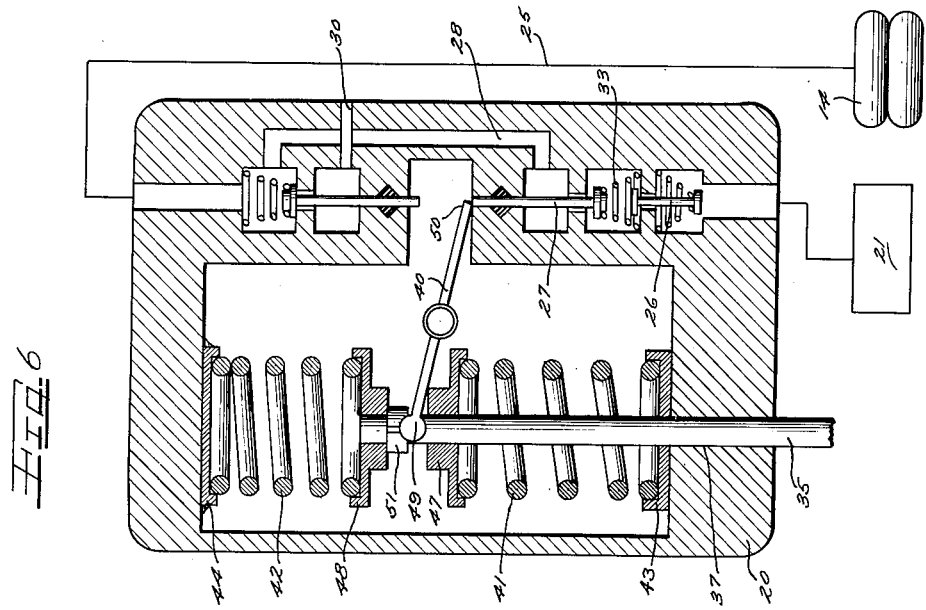
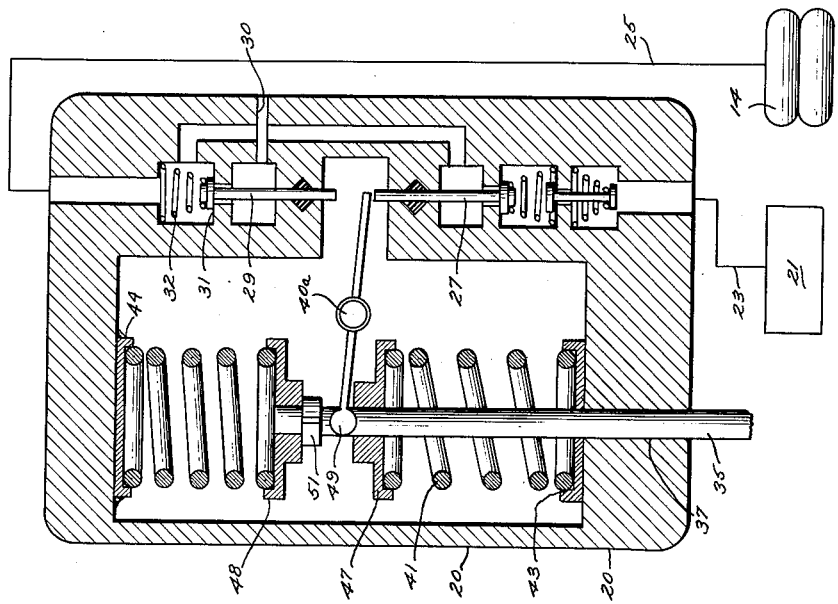
Inventor
CHARLES R. KILGORE
By Hill, Sherman, Meroni, Gross & Simpson Attys United States Patent Office 2,977,110
Patented Mar. 28, 1961

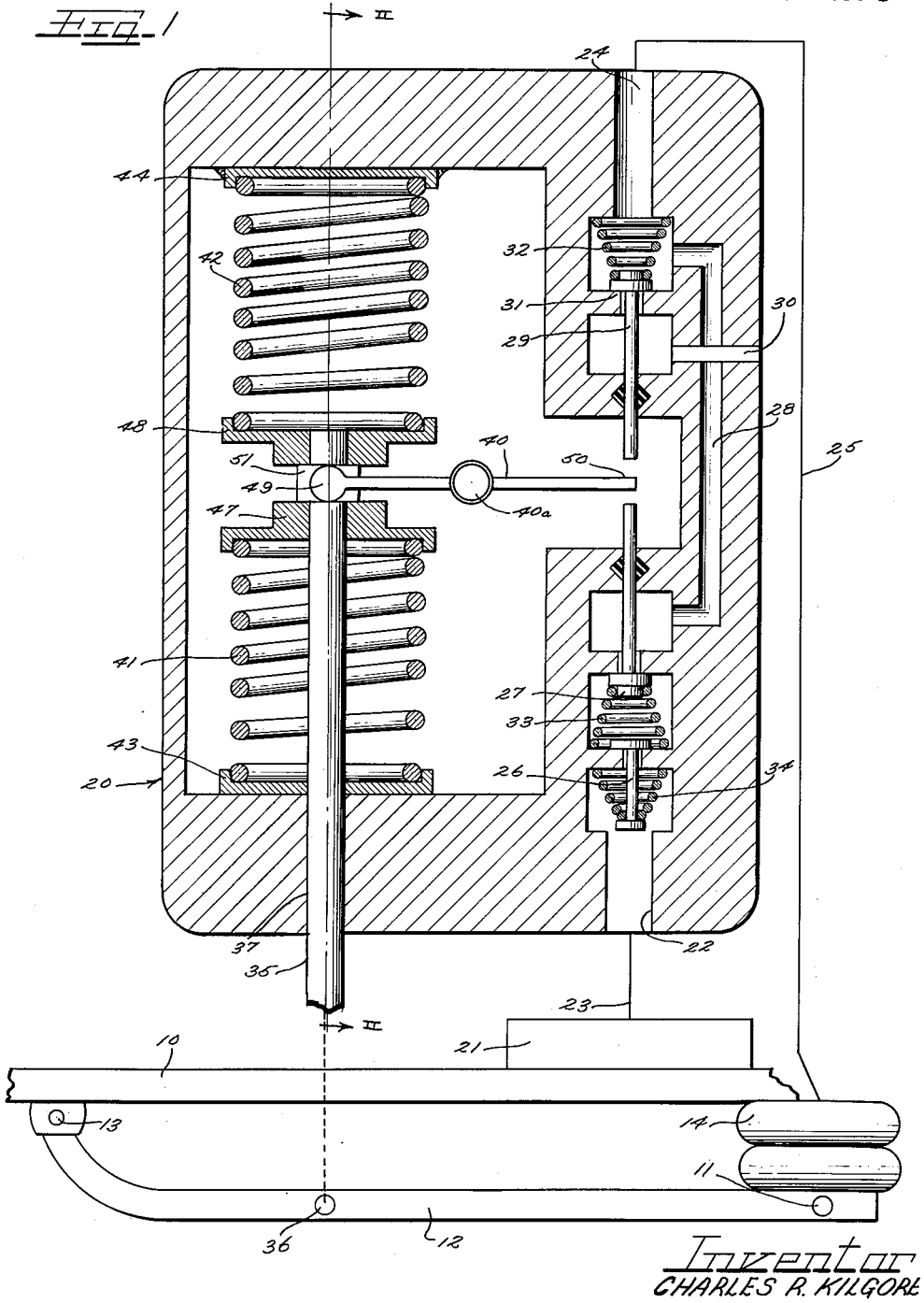

2,977,110

CONTROL VALVE

Charles R. Kilgore, Cleveland, Ohio, assignor to Thompson Ramo Wooldridge Inc., a corporation of Ohio Filed Aug. 22, 1957, Ser. No. 679,675

5 Claims. (Cl. 267—15)

The present invention relates to automotive vehicle suspensions and is, more particularly, concerned with the provision of a substantially improved control valve structure for use in pneumatic or hydro-pneumatic vehicle suspension springs to provide automatic vehicle body leveling.

As those skilled in the art of vehicle suspension are aware, the trend in the automotive industry has been toward the employment of pneumatic or hydro-pneumatic spring elements as substitutes for the leaf or coil-type springs commercially employed on automotive vehicles for many decades. Since such hydro-pneumatic or pneumatic springs all employ a confined volume of gas as the resilient, or spring medium, it has been found practical to provide automatic level control of the vehicle through the control of gas pressure within the individual spring elements, or alternatively, to control the amount of hydraulic fluid under pressure which is acting against the confined gas, in the case of hydro-pneumatic systems. Such control of the individual pneumatic spring elements requires, whether a gas or hydraulic liquid is being controlled, an accurate valve which is capable of controlling the gas or fluid effectively without inadvertent losses of pressure, and selectively so that changes in pneumatic spring pressure occur only when a change in vehicle body load occurs, as distinguished from oscillations imparted to the suspension system as a result of road undulation.

I am, of course, aware that leveling valves have been provided in such suspension systems. However, the valves with which I am familiar have all been excessive in cost and sufficiently erratic in operation to be considered unreliable for mass use. In accordance with the present invention, a leveling valve is provided wherein extreme sensitivity to vehicle load changes is provided and at the same time selectivity of the valve relative to load changes versus road vibrations is greatly improved and, further, is rendered uniform over all normal vehicle operating temperature ranges in a novel manner. Operation of the valve is substantially uniform during all operating conditions and, further, as a result of the construction employed, lubricating liquids and other fluids employed in the valve are completely dissociated from the controlled fluid so that contamination of the latter is in all cases prevented.

In a preferred form of the invention, by which the above results are achieved, a rotary valve actuator is employed and is operated through an improved spring connection which derives its input movement from the vertical movement of a suspension member, such as the axle adjacent a vehicle wheel. The spring energized rotary valve actuator is prevented from rotation on the application of transient forces, such as are applied when the vehicle wheels travel over an uneven road surface, by means of a time-delay means. This means comprises, in the preferred form of the invention, a friction movement-retarding device utilizing a liquid of essentially constant viscosity. The device employs a non-positive retarding force such that it is impossible for a delay means to become inoperative or locked even though the retarding liquid should in some way become contaminated. The output of the rotary valve actuator is directed to a pair of opposed poppet valves controlling the flow of controlled fluid to and from a pneumatic spring or the like comprising a confined volume of gas. The poppet valve leading fluid under pressure from a reservoir to the spring unit includes automatic means preventing control of fluid under pressure from returning to the storage reservoir under extreme pressure conditions that occasionally occur during rough road conditions and which, if not prevented, cause a leakage from the spring system. Such leakage causes, at the very least, a continuing oscillation of the control valving as controlled fluid leaks from the system and is replenished. Elimination of the problem in the present system has provided a substantially improved construction.

It is, accordingly, an object of the present invention to provide an efficient leveling control valve for automotive suspension systems, or the like, wherein extremely high sensitivity and substantially constant thermal selectivity are provided.

Another object of the present invention is to provide a vehicle suspension leveling valve incorporating an improved time-delay means for preventing valve actuation during the application of transient road-applied forces.

Still another object of the present invention is to provide a vehicle suspension leveling valve having a substantially thermally constant time-delay imposed upon the valving functions thereof.

Still a further object of the present invention is to provide an improved resilient connection between a suspended, or unsprung, portion of the vehicle and the valve actuating lever wherein extremely accurate and rapid response is provided and wherein the operating valve is sensitive to even a minute change in vehicle body elevation relative to said unsprung park.

Still a further object of the present invention is to provide a leveling valve employing poppet valves for the control of the spring controlling fluid and having reverse flow preventing valve means associated therewith for permitting the introduction of controlled fluid under pressure to the individual vehicle spring only upon the advent of control valve actuation and likewise permitting the removal of air or control fluid under pressure from the spring only upon positive control valve actuation.

A feature of the invention is the provision of a resilient connection having spring members under an initial preloaded condition whereby any deflection whatever of the spring actuating member will result in leveling valve operation.

Still another feature of the invention resides in the utilization of a time-delay means incorporating a silicone liquid arranged to provide substantially constant time-delay independently of temperature variations.

Still other and further objects and features of the present invention will at once become apparent to those skilled in the art from a consideration of the attached drawings wherein a preferred form of the invention is shown by way of illustration only, and wherein:

Figure 1 is a diagrammatic illustration of the leveling valve constructed in accordance with the present invention, taken in cross-section, and shown in association with vehicle suspension parts;

Figure 2 is a cross-sectional view of the leveling valve constructed in accordance with the principles of the present invention and taken generally along the line II—II of Figure 1;

Figure 3 is a cross-sectional elevational view taken along the line III—III of Figure 2;

Figure 4 is a view taken along the line IV—IV of Figure 2;

Figure 5 is a view of the components illustrated in Figure 1, showing the leveling valve in operation during the application of transient forces; and Figure 6 is a view similar to that shown in Figure 5 illustrating the valve in a condition in which vehicle leveling is actually occurring.

As shown on the drawings:

As viewed in Figure 1 of the drawings, the frame of an automotive vehicle, or the like, is diagrammatically illustrated at 10. A projecting wheel supporting axle is positioned as at 11, on a pivoted link member 12 which is secured to the frame 10 at the pivot joint 13. The axle 11 is positioned resiliently relative to the frame 10 by means of a pneumatic spring 14 which is, for purposes of the present invention, of any conventional design. In the arrangement shown, an increase in gas pressure in the pneumatic spring 14 will cause a lifting of the frame member 10 relative to the axle 11, thereby increasing the height of the vehicle body and, conversely, a decrease in pressure in the spring 14 will permit the body, on spring 14, to lower. It will be understood that for purposes of the present invention the frame, link 12, and spring 14 may be of any conventional structure and no claim is made to such devices in and of themselves.

In the embodiment of the invention illustrated, a leveling valve generally indicated at 20 is provided for controlling the flow of fluid under pressure to the spring 14. In the simplest system, from the point of view of conduits, air is employed in the spring 14 and accordingly the valve 20 is constructed to selectively introduce air under high pressure to the spring 14 or to vent pressure from the spring 14 to atmosphere. As shown, air under pressure is accumulated in a storage reservoir 21 located at any convenient point on the frame 10 and is directed to a valve inlet port 22 via a digrammatically illustrated conduit 23. The valve outlet port 24 connects the valve 20 to the spring 14 via diagrammatically illustrated conduit 25. Fluid under pressure entering the inlet port 22 is directed to conduit 25 and spring 14 via a unidirectional valve 26, a leveling poppet valve 27, intermediate conduit 28 and outlet port 24. Accordingly, reciprocation of the valve poppet 27 into a downward position as viewed in Figure 1, will cause the application of fluid under pressure to the spring 14. Conversely, when poppet valve 29 is actuated, upon a condition in which the pressure in spring 14 is too high, fluid will be bled from the outlet 24 to the atmosphere via a vent 30.

A consideration of Figure 1 will clearly demonstrate that pulsations of extremely high instantaneous air pressures within the spring 14, caused by road impacts etc. cannot effect the leakage of air in the spring 14 to atmosphere. It will be seen that the vent valve 29 is maintained in valve orifice closing position against its seat 31 by means of a spring 32 and that an increase in pressure in the spring 14 will merely tend to maintain the vent valve 29 seated. Should the pressure in the intermediate conduit 28 increase sharply as a result of road impact shocks, this increased pressure could unseat the valve 27 if the build-up pressure in the intermediate conduit 28 exceeds the pressure in the fluid reservoir 21 in combination with the strength of the spring 33. However, if such an unseating of the valve 27 should occur, the valve 26, which is maintained seated by the spring 34 prevents flow of fluid from the intermediate conduit 28 to the reservoir 21 in a positive manner. The spring 34 is a relatively weak spring in order that it will not interfere with the flow of air to the intermediate conduit 28 from the reservoir 21 upon the opening of the valve 27, even though the air pressure and the reservoir 21 may be only slightly greater than the desired pressure in the spring 14. It will be seen, therefore, that although fluid pressure may be introduced to the spring 14 from the reservoir 21 merely by opening the valve 27, reverse flow of fluid to the reservoir 21 is absolutely prevented unless the valve 26 is intentionally actuated. Actuation of the poppet valves 27 and 29, selectively, is automatically controlled, in the present invention, in response to the height of the frame 10 relative to the axle 11. As shown in the figures, a reciprocating actuating rod 35 is pivotally connected to the link 12, as at 36, and is reciprocably guided in the housing of the valve 20 by means of bearing guide 37. As a result of the arrangement shown, any relative movement between the axle 11 and the frame 10 will result in reciprocation of the rod 35. This reciprocation is translated into rotation of a rotary actuating lever 40 through a spring connection comprising a pair of opposed springs 41, 42 seated on spring seats 43 and 44 respectively, which are in turn secured to the housing or any other securing means. As shown in Figure 1 and, as more fully detailed in Figures 2 and 4, the individual springs 41 and 42 act through seats 47 and 48, respectively, against yoke 49 of the lever 40 and rotation of the lever 40 actuates a respective poppet valve 27 or at 29 by means of the lever end 50 interposed therebetween.

In the arrangement shown, it will be seen that reciprocation of the rod 35 will cause the upward movement of the spring seat 48 by means of a collar 51 secured to the rod 35. This will move the spring seat 48 upwardly away from the yoke 49 and will, at the same time, apply the force of spring 41 against the yoke 49 through the seat 47. Each of the springs 41 and 42 is pre-loaded in the initial assembly neutral position (in which the frame and axle are in their desired relative positions) to a force above that required to unseat the respective poppet valves 27 and 29. Accordingly, when for example, the spring 42 is compressed by upward movement of the rod 35 away from the desired relative positions, the seat 47 is moved upwardly by the spring 41 against the yoke 49 and the yoke 49 is instantly urged to move. This instant movement, or attempt to move, is assured since the spring 41 is, as above noted, pre-loaded to exert a force at all times in excess of the force of the spring 33 and upon removal of the force applied by the spring 42 occasioned by upward movement of the rod 35, the spring force will instantly be applied to the yoke 49 for valve actuation. As a result of this arrangement, even a small reciprocation of the rod 35 will cause an operation of the respective poppet valves 27 or 29. Further, it will be apparent that the amplitude of movement of the rod 35 will not vary the valve actuating force and thus will not vary the amount of time-delay described supra. This is true since upon such reciprocation of rod 35, only the force of the individual spring 41 or 42 is applied to the yoke 49 rather than a mere differential or an additive pressure as in prior systems. This provides a highly sensitive valve energizing action and, further, where the yoke 49 is provided with a width of the central abutment 51, subantially all vibration or rattling is eliminated from the valve and resilient, quiet operation is assured.

Movement of the yoke 49 by the reciprocation of the rod 35 would, in the absence of means now to be described, immediately cause actuation of the poppet valves 27, 29 independently of the reasons for reciprocation of the rod 35. Thus, upon movement of the vehicle over an uneven road, which would necessarily require the link 12 to oscillate relative to the frame 10, the rod 35 would reciprocate and alternately open the valves 27 and 29. This is, of course, undesired since road conditions are transient forces which do not affect the average level of the vehicle body relative to the road surface and which, accordingly, should not cause energization of any leveling control.

In order to eliminate the actuation of the valve 27 and 29 during the application of such transient forces, time-delay means is provided in the leveling valve 20. As shown, this time-delay takes the form of a simple yet far more effective time-delay than heretofore known in leveling systems. As shown in Figures 1 through 3, the lever 40 is rigidly secured to a pivot shaft 40a. The shaft 40a projects from the spring carrying chamber 52, through the sidewall of the housing 20 into a damping chamber 55. As shown in Figure 2, the shaft 40a carries fixedly secured for rotation therewith a plurality of vanes 56 which alternate with one or more vanes 57 secured to the housing 20 in a non-rotative manner. The chamber 55 is filled with a fluid having a suitable viscous drag and the vanes 56 and 57 are positioned sufficiently close to each other to take advantage of such viscous drag to retard rotation of the shaft 40a. In accordance with the present invention, the fluid employed in the chamber 55 is preferably liquid silicone. Such liquid silicones are well known and have, as a class, a substantially constant viscosity with temperature. This is extremely important in leveling valves for vehicles since vehicles are required to operate in temperatures ranging from many degrees below zero degrees Fahrenheit to well over one hundred degrees, and it is extremely desirable that the leveling of the suspension occur in a uniform manner over such temperature ranges. This is assured as a result of the present damping system wherein viscous drag of a silicone liquid is employed rather than retardation of movement by means of oil flowing through orifices, or the like. In accordance with the present invention, the delay means is completely impositive and does not require that a body of fluid or other material be passed through a restrictive orifice, or the like. Thus, the damping device of the present invention is independent of any possible blockages or locking resulting from contamination and it is, accordingly, impossible to render the delay device inoperative.

Although no adjustment of the delay means is illustrated in the drawings, it will be understood that the drag of the system may be increased by positioning the vanes 56 and 57 more closely adjacent to each other. Likewise, shims 45 may be positioned between the cover 58 and the flange 20a of the housing to provide an adjustable clearance between the inner surface 58a of the lid 58 and the vane 56. In any adjusted position, however, it will be understood that through the utilization of the vanes 56 and 57 in co-operation with a damping fluid having a substantially constant viscosity, uniform damping action will occur at all times without any possibility of the damping action being materially changed by contamination or temperature changes.

As a result of the action imposed upon the shaft 40a by the fluid in the chamber 55, reciprocation of the rod 35 will not instantaneously cause actuation of the valves 27 and 29. This may be understood from a consideration of Figures 5 and 6. As shown in Figure 5, the leveling valve 20 is shown in a position approximating the peak of a transient force application to the vehicle suspension, such as would occur when a vehicle hit a bump in the road. As may be seen, the rod 35 has been moved upwardly, as a result of the upward movement of the link 12, carrying with it spring seat 48 riding on the shoulder 51. Upward movement of the seat 48 removes any downward biasing force against the yoke 49 and applies the full force of the spring 41 through the yoke 49 through spring seat 47. As above noted, the spring 41 is preloaded in its neutral condition shown in Figure 1 to an extent sufficient to actuate the valve 27 and, accordingly, the upward movement of the rod 35, with the resultant expansion of spring 41, would immediately actuate the valve 27 except for the presence of the retarding device attached to the shaft 40a. With the retarding mechanism, however, before the yoke 49 will have moved sufficiently far to unseat the valve 27, the transient force applied to the system will have been removed from the system and the rod 35 will have moved downwardly.

On the other hand, if a relatively constant force is applied to the system, such as for example, when an additional person enters the vehicle, the additional force tending to lower the frame 10 relative to the link 12 will be applied over a long period of time. The result of this additional weight will be seen from Figure 6 from which it will be noted that the end 50 of the lever 40 has moved downward to open the valve 27 against the force of the spring 33. This movement of the lever 40 is permitted when the spring 41 acts against the yoke 49 through the spring seat 47 over a continued period of time, ordinarily several seconds, during which the viscous drag applied to the shaft 40a, tending to retard movement of the lever 40 will have been overcome. When the valve 27 has been opened, as above described, air or other fluid under pressure in the reservoir 21 will unseat the one-way valve 26 permitting the flow of air to the spring 14 via intermediate conduit 28 and spring conduit 25. If, during the time when valve 27 is open for leveling purposes, transient loads are applied to the system as a result of road shocks, etc. It will be impossible, with the structure herein shown, for air to be forced back into the reservoir 21. Such movement of air is prevented effectively by the valve 26.

In the invention as illustrated, it will be noted that the silicone liquid employed in the time-delay means is completely sealed from any association whatever with the fluid controlled by the valves 26, 27 and 29. Further, since the damping means of the present invention employs viscous drag of a liquid, rather than a restriction of liquid flow through an orifice, or the like, no high liquid pressures are applied to the seals surrounding the shaft 40a between the chambers 52 and 55. As a result, no leakage of the dampening liquid is encountered and maintenance of the leveling valve is accordingly greatly simplified.

It will thus be seen that I have provided a novel and substantially improved leveling valve for vehicle suspensions, which leveling valve provides extremely rapid response with effective selectivity between transient and non-transient load changes. The use of the invention permits an extremely inexpensive leveling valve which is essentially foolproof.

It will, of course, be understood that variations and modifications can be made without departing from the scope of the novel concepts of the present invention. For example, as has been noted above, the leveling valve may be employed for the control of a liquid under pressure, which liquid is applied to a hydro-pneumatic spring for adjustment thereof. The arrangement illustrated will satisfactorily operate on hydraulic fluids, whether liquid or gaseous. Accordingly, it is my intention that the scope of the present invention not be limited to the single embodiment illustrated in the drawings but rather, be controlled solely by the scope of the hereinafter appended claims.

I claim as my invention:

1. In combination in a vehicle having a frame member and a wheel supporting axle member pivotally supported thereon, a housing secured to one of said members, actuating means movable in said housing upon a change in the relative positions of said members and normally centered when said members are positioned at their desired relative positions, a pneumatic spring between said members, valve means controlling the gas pressure in said spring and actuated by said actuating means, a pair of pre-loaded spring means between said actuating means and said housing for resiliently operating said actuating means upon relative movement of said members away from said desired relative positions, and means to compress one spring away from said actuating means to permit the other spring to operate said valve means, and substantially constant viscosity time delay means for retarding movement of said actuating means independently of variations in temperature, said last named means comprising at least one plate movable relative to another plate adjacent thereto within a body of substantially constant viscosity liquid whereby the viscous drag of said plates in said liquid determines said time delay.

2. In combination in a leveling valve for controlling the flow of gas under pressure to and from a pneumatic spring supporting a vehicle frame on an axle, an actuating lever for selectively opening spring inlet and vent valves, delay means retarding movement of said lever toward valve opening position, and spring means for biasing the lever to valve opening position upon relative movement between said frame and said axle, said spring means comprising a pair of springs positioned on opposite sides of said lever and biasing the lever in opposite directions, a rod operatively connected to said axle, means on said rod for compressing one of said springs away from said lever upon movement of said rod away from a predetermined desired position relative to said frame and permitting the other spring to act alone on said lever whereby said lever is biased by said other spring only to actuate a respective vent or inlet valve.

3. In combination in a leveling valve for controlling the flow of gas under pressure to and from a pneumatic spring supporting a vehicle frame on an axle, an actuating lever for selectively opening spring inlet and vent valves, delay means retarding movement of said lever toward valve opening position, and spring means for biasing the lever to valve opening position upon relative movement between said frame and said axle, said spring means comprising a pair of springs positioned on opposite sides of said lever and biasing the lever in opposite directions, a rod operatively connected to said axle, means on said rod for compressing one of said springs away from said lever upon movement of said rod away from a predetermined desired position relative to said frame and permitting the other spring to act alone on said lever whereby said lever is biased by said other spring only to actuate a respective vent or inlet valve, each one of said springs being pre-loaded in the said desired position to a compressive force at least equal to the force required to open the valves.

4. In combination in a leveling valve for controlling the flow of a hydraulic fluid under pressure to and from a hydraulic spring supporting a vehicle frame on an axle, an actuating lever for selectively opening spring inlet and vent valves, delay means retarding movement of said lever toward said valve opening position upon relative movement between said axle and said frame, and spring means for biasing the lever to valve opening position upon relative movement between said frame and said axle, said spring means comprising a pair of springs positioned on opposite sides of said lever and biasing the lever in opposite directions, a rod operatively connected to said axle, means on said rod for compressing one of said springs away from said lever upon movement of said rod away from a predetermined desired position relative to said frame and permitting the other spring to act alone on said lever whereby said lever is biased by said other spring only to actuate a respective vent or inlet valve.

5. In combination in a levelling valve for controlling the flow of a hydraulic fluid under pressure to and from a hydraulic spring supporting a vehicle frame on an axle, an actuating lever for selectively opening spring inlet and vent valves, delay means retarding movement of said lever toward said valve opening position upon relative movement between said axle and said frame, and spring means for biasing the lever to valve opening position upon relative movement between said frame and said axle, said spring means comprising a spring constantly tending to move said lever, a rod operatively connected to said axle, means on said rod preventing said spring from moving said lever when said rod is in a neutral desired position, said last named means being moved away from said spring to permit said spring to act on said lever when said rod is moved away from its neutral condition, thereby providing actuation of said lever by said spring only.

References Cited in the file of this patent
UNITED STATES PATENTS

| | | |
|---|---|---|
| 2,150,576 | Bell | Mar. 14, 1939 |
| 2,715,023 | Nallinger | Aug. 9, 1955 |
| 2,768,798 | Johnston et al. | Oct. 30, 1956 |
| 2,779,442 | Bacon | Jan. 29, 1957 |